UNITED STATES PATENT OFFICE.

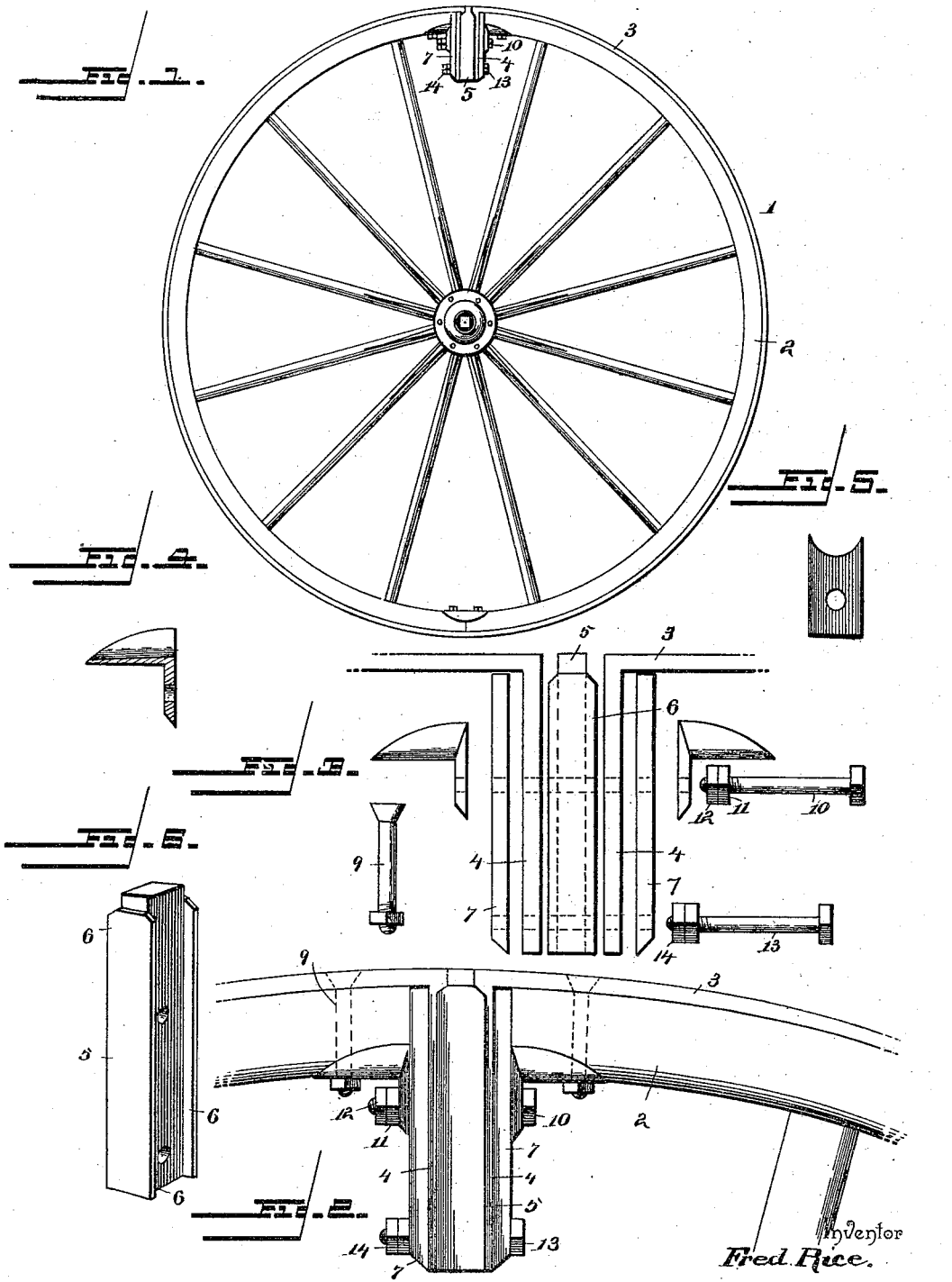

FRED RICE, OF SHOPIERE, WISCONSIN, ASSIGNOR OF ONE-HALF TO FRANK L. STEADWELL, OF SAME PLACE.

VEHICLE-WHEEL.

SPECIFICATION forming part of Letters Patent No. 554,731, dated February 18, 1896.

Application filed August 29, 1895. Serial No. 560,916. (No model.)

*To all whom it may concern:*

Be it known that I, FRED RICE, a citizen of the United States, residing at Shopiere, in the county of Rock and State of Wisconsin, have invented a new and useful Vehicle-Wheel, of which the following is a specification.

The invention relates to improvements in wheels.

The object of the present invention is to improve the construction of vehicle and other wheels employing a metal tire and a wooden felly and to enable the tire to be tightened in excessively-dry weather and to be loosened in wet weather when the wood swells to prevent the spokes from bending and the wheel from becoming dished.

The invention consists in the construction and novel combination and arrangement of parts hereinafter fully described, illustrated in the accompanying drawings, and pointed out in the claims hereto appended.

In the drawings, Figure 1 is a side elevation of a vehicle-wheel constructed in accordance with this invention. Fig. 2 is an enlarged detail view of tire-adjusting devices and the adjacent portion of the wheel. Fig. 3 is a similar view of a portion of the tire-adjusting device, the parts being separated. Figs. 4 and 5 are detail views of the knee or clip. Fig. 6 is a similar view of the removable bar which is interposed between the ends of the tire.

Like numerals of reference indicate corresponding parts in all the figures of the drawings.

1 designates a vehicle-wheel having a wooden felly 2 and provided with a metal tire 3, which has its ends separated and bent inward substantially at right angles to form arms 4. Between the arms 4 is interposed a removable spacing-bar 5, which is provided at its outer faces with flanges 6 to overlap and embrace the arms 4 and which is adapted to be removed and to be replaced by a spacing-bar of a different size, whereby the tire may be contracted or expanded to shorten it in dry weather and to enlarge it in wet or damp weather when the felly expands to prevent the spokes from being bowed and the wheel from becoming dished.

Removable plates 7 are arranged between the ends of the felly 2 and the arms 4 of the tire, and the felly has secured to its spaced ends substantially L-shaped clip-plates or knees, which have transversely-curved outer portions conforming to the configuration of the felly and secured to the same and to the tire by bolts 9. The inwardly-extending portions of the knees or clips have flat inner faces to fit against the removable plate 7 and are connected by a transverse bolt 10, which passes through perforations of the knees or clips, the removable plates, the ends of the tire and the spacing-bar and which is provided with a nut 11 and a jam-nut 12. The parts are connected at the inner terminals of the arms 4 by a transverse bolt 13, passing through registering perforations and provided with a jam-nut 14.

The plates 7 are adapted to be removed and may be of any desired thickness to adjust the felly to the tire properly, and the transverse bolts may be increased in number when the adjusting devices are employed on excessively-heavy wheels. Two sets of adjusting devices may be employed on a wheel and be arranged at diametrically-opposite points.

It will be seen that the tire is adapted to be readily adjusted to preserve it at the proper degree of tightness to take up slack and to prevent the wheel from becoming dished, and that the adjustment does not require the services of a skilled mechanic or wheelwright, and that it is unnecessary to take the wheel to a shop in order to shorten or enlarge the tire.

Changes in the form, proportion, and the minor details of construction may be resorted to without departing from the principle or sacrificing any of the advantages of this invention.

What I claim is—

1. In a wheel, the combination with a felly, of a tire having its ends bent inward parallel with each other to form arms, a spacing-bar interposed between the arms, the L-shaped knees or clips secured to the ends of the felly and arranged adjacent to the arms of the tire, and a fastening device passing through the knees or clips, the arms and the spacing-bar, substantially as described.

2. In a wheel, the combination of a felly, a tire having its ends bent inward parallel with each other to form arms, removable plates interposed between the ends of the felly and the arms of the tire, a spacing-bar arranged between the arms of the tire, the substantially L-shaped clips secured to the ends of the felly and arranged at the outer faces of the plates, and a fastening device extending through the clips, the plates, the arms and the spacing-bar, substantially as described.

3. In a wheel, the combination of a felly, a tire having its ends bent inward parallel to form arms, removable plates interposed between the ends of the felly and the arms, a spacing-bar interposed between the arms and provided at its sides with projecting flanges arranged in pairs and embracing the arms of the tire, the substantially L-shaped knees or clips secured to the ends of the felly and arranged at the outer faces of the plates, and fastening devices passing through all of the parts, substantially as described.

In testimony that I claim the foregoing as my own I have hereto affixed my signature in the presence of two witnesses.

FRED RICE.

Witnesses:
W. J. McINTYRE,
L. M. NELSON.